US010962668B2

(12) United States Patent
Liu et al.

(10) Patent No.: US 10,962,668 B2
(45) Date of Patent: Mar. 30, 2021

(54) SURFACE-SCATTERED NOISE REDUCTION

(71) Applicant: Saudi Arabian Oil Company, Dhahran (SA)

(72) Inventors: Hongwei Liu, Al-Khobar (SA); Yi Luo, Dhahran (SA); Vincent Etienne, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 516 days.

(21) Appl. No.: 15/864,286

(22) Filed: Jan. 8, 2018

(65) Prior Publication Data

US 2018/0246242 A1 Aug. 30, 2018

Related U.S. Application Data

(60) Provisional application No. 62/463,988, filed on Feb. 27, 2017.

(51) Int. Cl.
*G01V 1/38* (2006.01)
*G01V 1/28* (2006.01)
(Continued)

(52) U.S. Cl.
CPC ............... *G01V 1/364* (2013.01); *G01V 1/28* (2013.01); *G01V 1/282* (2013.01); *G01V 1/36* (2013.01);
(Continued)

(58) Field of Classification Search
CPC .......................................................... G01V 1/38
See application file for complete search history.

(56) References Cited

U.S. PATENT DOCUMENTS 4,992,993 A * 2/1991 Chambers ............... G01V 1/28
367/21
2011/0166790 A1 7/2011 Pica
(Continued)

OTHER PUBLICATIONS

Luo, Wenyu, and Henrik Schmidt. "Three-dimensional propagation and scattering around a conical seamount." The Journal of the Acoustical Society of America 125.1 (2009): 52-65. (Year: 2009).*
(Continued)

*Primary Examiner* — Omar F Fernandez Rivas
*Assistant Examiner* — David A Hopkins
(74) *Attorney, Agent, or Firm* — Fish & Richardson P.C.

(57) ABSTRACT

A method of reducing surface-scattered noise includes receiving seismic data associated with a marine region, where the marine region includes an ocean bottom, a first zone including water above the ocean bottom, and a second zone including earth subsurface layers below the ocean bottom, and the received seismic data includes signals reflected from the earth subsurface layers and surface-scattered noise reflected from the ocean bottom and an ocean surface; determining a water velocity for the first zone; determining bathymetric values of the ocean bottom; based on the determined water velocity and the bathymetric values, determining a velocity model for the marine region; based on the determined velocity model and wavelet functions of seismic source signals, calculating the surface-scattered noise by solving a wave equation; and determining the signals reflected from the earth subsurface layers by subtracting the calculated surface-scattered noise from the received seismic data.

16 Claims, 3 Drawing Sheets

(51) Int. Cl.
    *G01V 1/36* (2006.01)
    *G01V 1/30* (2006.01)
(52) U.S. Cl.
    CPC .............. *G01V 1/38* (2013.01); *G01V 1/303* (2013.01); *G01V 2210/1293* (2013.01); *G01V 2210/1423* (2013.01); *G01V 2210/22* (2013.01); *G01V 2210/324* (2013.01); *G01V 2210/3246* (2013.01); *G01V 2210/34* (2013.01); *G01V 2210/56* (2013.01); *G01V 2210/6222* (2013.01); *G01V 2210/675* (2013.01)

(56) References Cited

U.S. PATENT DOCUMENTS

| | | | | |
|---|---|---|---|---|
| 2015/0006085 | A1* | 1/2015 | Bisley | G01V 1/36 702/14 |
| 2017/0031044 | A1* | 2/2017 | Ni | G01V 1/364 |

OTHER PUBLICATIONS

Earls, Patrick J. New Bottom Roughness Calculation from Multibeam Echo Sounders for Mine Warfare. Naval Postgraduate School Monterey CA Dept of Oceanography, 2012. (Year: 2012).*
Alkhalifah, Tariq. "An acoustic wave equation for anisotropic media." Geophysics 65.4 (2000): 1239-1250. (Year: 2000).*
Chandra, G. V. P., et al. "Performance of Wiener Filter and Adaptive Filter for Noise Cancellation in Real-Time Environment." International journal of computer applications 97.15 (2014). (Year: 2014).*
Pyun, Sukjoon, Changsoo Shin, and Wookeen Chung. "Equivalent source distribution for efficient 3-D acoustic wave equation modelling in the Laplace domain." Geophysical Journal International 186.2 (2011): 740-750. (Year: 2011).*
Schuster, G. "Basic principles of wave propagation." (2011). Accessed electronically at the Center for Subsurface Imaging and Fluid Modeling at King Abdullah University of Science and Technology (Year: 2011).*
Wikipedia, Article "Acoustic Wave Equation", Accessed electronically Jun. 23, 2020 (Year: 2020).*
Pyun, Sukjoon, Woohyun Son, and Changsoo Shin. "3D acoustic waveform inversion in the Laplace domain using an iterative solver." Geophysical Prospecting 59.3 (2011): 386-399. (Year: 2011).*
Yoon, Byoung Joon, et al. "3D acoustic modelling and waveform inversion in the Laplace domain for an irregular sea floor using the Gaussian quadrature integration method." Journal of Applied Geophysics 87 (2012): 107-117. (Year: 2012).*
Ellis, Dale D., and D. M. F. Chapman. "A simple shallow water propagation model including shear wave effects." The Journal of the Acoustical Society of America 78.6 (1985): 2087-2095. (Year: 1985).*
Wang et al., "Model-based Water-layer Demultiple," SEG San Antonio 2011 Annual Meeting, Sep. 18, 2011, 5 pages.
Pica et al., "3D Surface-related multiple modeling, principles and results," SEG Technical Program Expanded Abstracts 2005, Jan. 1, 2005, 5 pages.
Stork et al., "Predicting and removing complex 3D surface multiples with WEM modeling—an alternative to 3D SRME for wide azimuth surveys?" SEG Technical Program Expanded Abstracts, Oct. 1, 2006, 5 pages.
International Search Report and Written Opinion issued in International Application No. PCT/US2018/019834 dated Jun. 11, 2018, 17 pages.
Gulf Cooperation Council Examination Report issued in GCC Application No. GC 2018-34852 dated Oct. 16, 2019, 4 pages.

* cited by examiner

SURFACE-SCATTERED NOISE REDUCTION

CROSS REFERENCE TO RELATED APPLICATIONS

This application claims priority to U.S. Application Ser. No. 62/463,988 filed on Feb. 27, 2017, the entire contents of which is hereby incorporated by reference.

TECHNICAL FIELD

This disclosure relates to seismic data processing and, more specifically, to surface-scattered noise reduction.

BACKGROUND

Marine seismic exploration can be used to estimate properties of earth subsurface layers under an ocean bottom and predict potential oil or gas locations for exploration activities. For example, a marine seismic vessel can carry a seismic energy source, such as an air gun or a water gun, to generate acoustic signals or waves that propagate into the ocean water and the earth subsurface layers. The acoustic signals can be reflected by the earth subsurface layers, for example, by seismic reflectors at the interfaces between the subsurface layers. The seismic energy source can generate acoustic signals at different locations as the vessel moves along. The reflected signals can be recorded by an array of receivers, called hydrophones, that are attached to lines towed by the seismic vessel. The recorded signals, also called seismic data, are processed to estimate the properties of the subsurface layers.

SUMMARY

The present disclosure describes methods and systems, including computer-implemented methods, computer program products, and computer systems for surface-scattered diffraction noise reduction.

In an implementation, seismic data is received associated with a marine region, where the marine region includes an ocean bottom, a first zone including water above the ocean bottom, and a second zone including earth subsurface layers below the ocean bottom. The received seismic data includes signals reflected from the earth subsurface layers and surface-scattered noise reflected from the ocean bottom and an ocean surface. A water velocity for the first zone and bathymetric values of the ocean bottom are determined. Based on the determined water velocity and the bathymetric values, a velocity model for the marine region is determined. Based on the determined velocity model and wavelet functions of seismic source signals, the surface-scattered noise is calculated by solving a wave equation. The signals reflected from the earth subsurface layers are determined by subtracting the calculated surface-scattered noise from the received seismic data.

The previously-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can enhance seismic data by reducing surface-scattered noise. The enhanced seismic data can be used to better estimate properties of earth subsurface layers for oil and gas exploration. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes surface-scattered noise reduction and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from scope of the disclosure. Thus, the present disclosure is not intended to be limited to the described or illustrated implementations, but is to be accorded the widest scope consistent with the principles and features disclosed.

Marine seismic exploration uses reflected seismic waves to estimate earth subsurface formations. The reflected waves recorded (that is, seismic data) can include not only desired signals reflected by interfaces between subsurface layers, but also unwanted signals reflected by the ocean bottom and the ocean surface. The signals reflected by the ocean bottom and the ocean surface is also called surface-scattered noise. For example, the surface-scattered noise can include reflection by the ocean bottom as well as multiple reflections between the ocean bottom and the ocean surface. The surface-scattered noise is often strong when the ocean bottom has rapid bathymetry variations. The strong noise can severely degrade quality of seismic data and hinder interpretation of subsurface images.

Existing methods are not effective in reducing surface-scattered noise for shallow water with rugged bathymetry. For example, ray tracing can be used to predict the surface-scattered noise, but it is insufficient to model physics of multi-path scattering. Other methods, such as surface related multiple elimination (SRME) and shallow water demultiple (SWD), become inadequate when the scatters are complex or lack of full coverage of source and receiver locations in acquisition. Therefore, it is desired to develop an effective method to reduce surface-scattered noise in seismic data.

At a high level, the described approach predicts the surface-scattered noise and subtracts the predicted noise from the seismic data. Since the ocean bottom bathymetry can be measured accurately, the surface-scattered noise is modeled by scattered waves based on ocean-bottom bathymetry, water velocity, and seismic source wavelets. The surface-scattered noise can be computed by numerically solving a wave equation based on the ocean-bottom bathymetry, water velocity, and seismic source wavelets. The computed noise is adaptively subtracted from the seismic data based on Wiener filtering. The described approach can simulate scattered energy in all directions and is applicable to any kinds of acquisition geometry.

Figure 1:
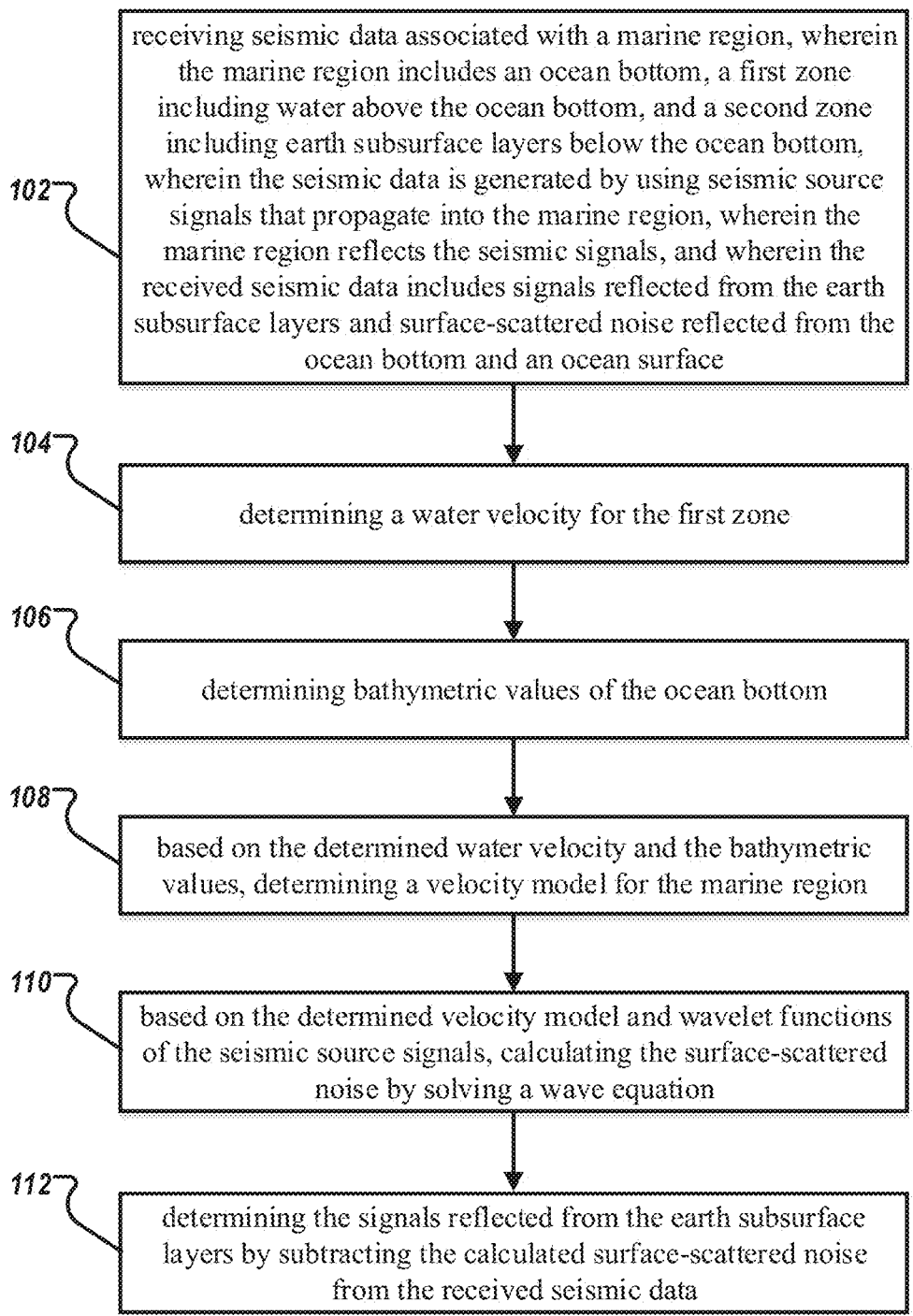
FIG. 1 is a flowchart illustrating an example method for surface-scattered noise reduction, according to some implementations.

FIG. 1 is a flowchart of an example method 100 for surface-scattered noise reduction, according to some implementations. For clarity of presentation, the description that follows generally describes method 100 in the context of the other figures in this description. For example, method 100 can be performed by a computer system described in FIG. 3. However, it will be understood that method 100 may be performed, for example, by any suitable system, environment, software, and hardware, or a combination of systems, environments, software, and hardware as appropriate. In some implementations, various steps of method 100 can be run in parallel, in combination, in loops, or in any order.

The method 100 starts at block 102 where seismic data associated with a marine region is received. The marine region includes an ocean bottom, a first zone including water above the ocean bottom, and a second zone including earth subsurface layers below the ocean bottom. The seismic data is generated by sending seismic source waves, for example, from a seismic energy source such as an air gun, into the marine region and digitally sampling the seismic waves reflected by the marine region. The seismic data captures reflected waves as a function of time. The seismic data can include amplitudes, phases, or both, of the reflected waves. The received seismic data can include waves reflected from the earth subsurface layers and surface-scattered noise reflected from the ocean bottom and the ocean surface. In some cases, if the ocean bottom in the marine region has rapid bathymetry variations, the surface-scattered noise can be strong and it is of interest to reduce the surface-scattered noise. For example, an ocean bottom has rapid bathymetry variations if a variance of bathymetric values of the ocean bottom exceeds a threshold.

At block 104, a water velocity for the first zone can be determined. In some implementations, water velocities at different locations in the first zone can be measured, and an average velocity over the different locations can be used as the water velocity for the first zone. In some cases, the velocity includes both a velocity value and a velocity direction.

At block 106, bathymetric values of the ocean bottom can be determined. For example, bathymetric values of the ocean bottom can be measured using some measurement tools or methods.

At block 108, based on the determined water velocity and bathymetric values, a two-layer velocity model for the marine region can be determined. The two-layer velocity model includes a first velocity for the first zone and a second velocity for the second zone, where the boundary between the first zone and the second zone is determined by the bathymetric values of the ocean bottom from block 106. In the velocity model, the first velocity for the first zone is set to be the water velocity determined at block 104, and the second velocity for the second zone is set to be a vertically-constant velocity having a predefined velocity value and a vertical velocity direction. In other words, the seismic velocity property below the ocean bottom is set to be vertically-constant velocities. In some implementations, the predefined velocity value for the second zone is different than the water velocity value for the first zone, for example, the predefined velocity value can be larger than the water velocity value for the first zone. In some implementations, the velocity model uses the first velocity for locations in the first zone and the second velocity for locations in the second zone.

At block 110, based on the determined velocity model and wavelet functions of seismic source signals, the surface-scattered noise is calculated by solving a wave equation. For example, the surface-scattered noise at any spatial location or position in the marine region can be modelled by solving the following three-dimensional (3D) acoustic wave equation:

$$\frac{1}{c^2}\ddot{p} = \nabla^2 p + \delta(x_s, y_s, z_s)s(t), \quad (1)$$

where $(x_s, y_s, z_s)$ represents a spatial position of the seismic energy source (that is, the shot position of the air gun), $\delta(x_s, y_s, z_s)$ is a Dirac delta function which is zero everywhere except at the spatial position $(x_s, y_s, z_s)$, $s(t)$ is a source wavelet function of the seismic source waves, $p(x, y, z, t)$ (which is denoted as p in Equation (1) for brevity) is the surface-scattered noise at a spatial position $(x, y, z)$, and $c(x, y, z)$ (which is denoted as c in Equation (1) for brevity) is the velocity at a spatial position $(x, y, z)$ based on the velocity model at block 108. For example, if the spatial position $(x, y, z)$ is in the first zone of the marine region, c is set to be the water velocity of the first zone in the velocity model. If the spatial position $(x, y, z)$ is in the second zone of the marine region, c is set to be the vertically-constant velocity of the second zone in the velocity model. In some implementations, the source wavelet function can be a Ricker wavelet such as $s(t)=(1-2\pi^2 f_M^2 t^2)e^{-\pi^2 f_M^2 t^2}$. In equation (1), $\ddot{p}$ is a second partial derivative of $p(x, y, z, t)$ with respect to time t, and $\nabla^2$ is a Laplace operator. Equation (1) can be solved numerically to predict the surface-scattered noise $p(x, y, z, t)$ using numerical methods such as finite difference, time domain finite difference, pseudo spectrum, finite element method, spectral element, and other numerical methods consistent with this disclosure. After solving $p(x, y, z, t)$ from Equation (1), the surface-scattered noise at a receiver position $(x_r, y_r, z_r)$ can be obtained by:

$$r(x_r, y_r, z_r, t) = \delta(x_r, y_r, z_r)p(x, y, z, t), \quad (2)$$

where $r(x_r, y_r, z_r, t)$ represents the surface-scattered noise at the receiver to be subtracted from the seismic data, and $\delta(x_r, y_r, z_r)$ is a Dirac delta function which is zero everywhere except at the spatial position $(x_r, y_r, z_r)$. In some implementations, the source and receiver positions $(x_s, y_s, z_s)$ and $(x_r, y_r, z_r)$ in Equations (1) and (2) are the same as those used in the field acquisition. By solving the acoustic wave equation using the two-layer velocity model, the resulted solution will include direct wave and the scattered noise, while the reflection signals below the bathymetry will not be generated.

At block 112, the signals reflected from the earth subsurface layers are determined by subtracting the surface-scattered noise from the seismic data. For example, at each receiver position, the predicted surface-scattered noise at that position is subtracted from the seismic data received at the same position. The surface-scattered noise can be adaptively subtracted from the seismic data by using an adaptive filter, such as a Wiener filter or other adaptive filters consistent with this disclosure. For example, at a receiver position $(x_r, y_r, z_r)$, coefficients of the Wiener filter can be calculated by minimizing the following objective function:

$$L = \sum_t (f(t)*n(t) - d(t))^2, \quad (3)$$

where f(t) represents coefficients of the Winer filter, n(t) is the surface-scattered noise at the receiver position $(x_r, y_r, z_r)$ (that is, $r(x_r, y_r, z_r, t)$ in Equation (2)), d(t) is the received seismic data at the receiver position $(x_r, y_r, z_r)$, and * represents convolution operation. The filter coefficient f(t) minimizes a difference between the seismic data d(t) and the filtered surfaced-scattered noise f(t)*n(t) summed over different sampling time instants. The filter coefficient f(t) can be solved by Levinson recursive algorithm or other recursive algorithms consistent with this disclosure. In some implementations, the desired signals reflected from the earth subsurface layers can be obtained by d(t)−f(t)*n(t).

Figure 2:
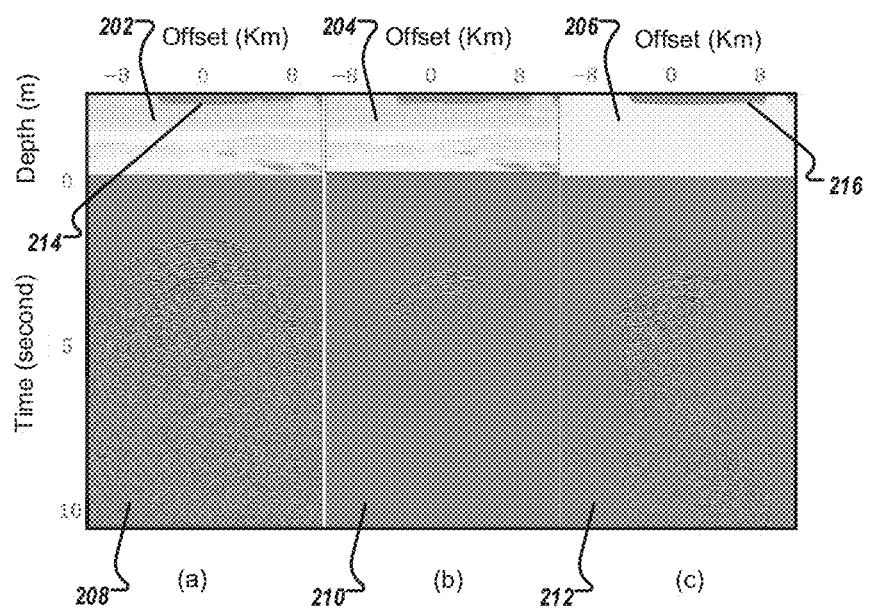
FIG. 2 illustrates examples of velocity model and seismic data for surface-scattered noise reduction, according to some implementations.

FIG. 2 illustrates examples of velocity model and seismic data 200 for surface-scattered noise reduction, according to some implementations. FIG. 2 includes three subfigures (a), (b), and (c). In subfigures (a), (b) and (c), the top FIGS. 202, 204, and 206 show velocities for the marine region, where the horizontal axis represents a distance between the seismic energy source position and the receiver position, the vertical axis represents a depth, and the different grayscale levels represents different velocity values. The bottom FIGS. 208, 210, and 212 show seismic data, where the vertical axis represents a time and the horizontal axis represents the distance between the seismic energy source position and the receiver position (same as the top FIGS. 202, 204, and 206). In subfigure (a), the top FIG. 202 shows true velocities of the marine region with an ocean bottom 214, and the bottom FIG. 208 shows seismic data received for a time duration of about 10 seconds and a distance of about 16 kilometers. In some cases, instead of real data from field acquisition, the seismic data in the FIG. 208 can be computed synthetic data generated based on the velocities in the top FIG. 202. In subfigure (c), the top FIG. 206 shows a two-layer velocity model including the water velocity for the zone above the ocean bottom 216 and a vertically-constant velocity for the zone below the ocean bottom 216. The zone above and below the ocean bottom 216 have different grayscale levels, illustrating two different velocity values for the two zones. The bottom FIG. 212 shows predicted unwanted surface-scattered noise based on the two-layer velocity model in the top FIG. 206 using Equations (1) and (2). In the top FIG. 206, the ocean bottom 216 is the same as the ocean bottom 214, but the reflections beneath the ocean bottom are removed. Muting interior reflectors can eliminate the surface-scattered noise. In subfigure (b), the bottom FIG. 210 shows the desired reflection signals after adaptively removing the surface-scattered noise in the bottom FIG. 212 from the seismic data in the bottom FIG. 208, for example, based on the objective function in Equation (3). In some cases, the summation of the data in the bottom FIGS. 210 and 212 equals the data in the bottom FIG. 208.

Figure 3:
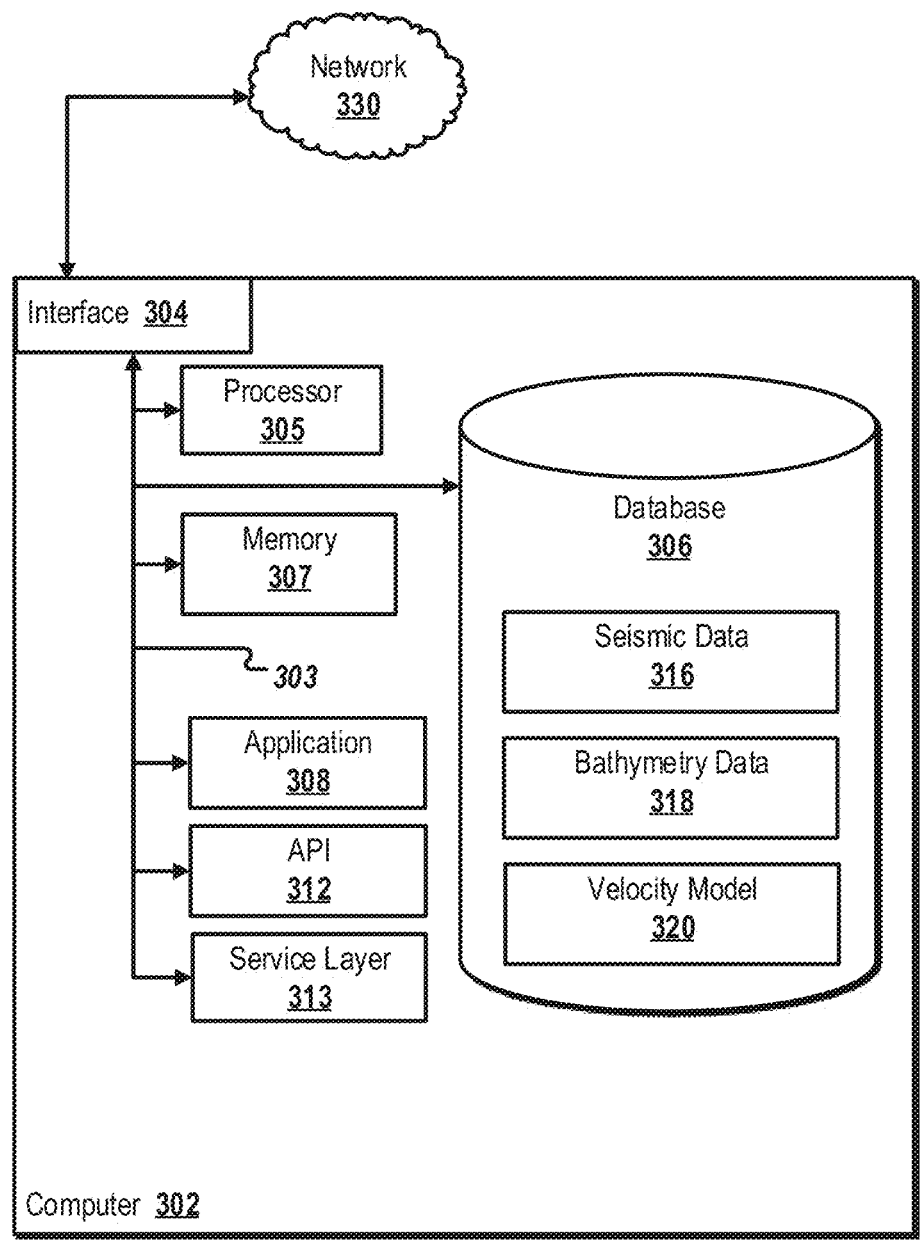
FIG. 3 is a block diagram illustrating an example computer system used to provide computational functionalities associated with described algorithms, methods, functions, processes, flows, and procedures as described in the instant disclosure, according to some implementations.

FIG. 3 is a block diagram of an example computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and responding to the received requests by processing the received requests using an appropriate software application(s). In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems that are connected to the network 330 (whether illustrated or not) in a distributed environment. Generally, the interface 304 comprises logic encoded in software or hardware (or a combination of software and hardware) and is operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302. As illustrated, the database 306 holds previously-described received seismic data 316, bathymetry data of the ocean bottom 318, and the two-layer velocity model 320.

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, or applications. Further, although illustrated as a single application 308, the application 308 may be implemented as multiple applications 308 on the computer 302. In addition, although illustrated as integral to the computer 302, in alternative implementations, the application 308 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a method, comprising: receiving, by a hardware processor, seismic data associated with a marine region, wherein the marine region includes an ocean bottom, a first zone including water above the ocean bottom, and a second zone including earth subsurface layers below the ocean bottom, wherein the seismic data is generated by using seismic source signals that propagate into the marine region, wherein the marine region reflects the seismic source signals, and wherein the received seismic data includes signals reflected from the earth subsurface layers and surface-scattered noise reflected from the ocean bottom and an ocean surface; determining, by the hardware processor, a water velocity for the first zone; determining, by the hardware processor, bathymetric values of the ocean bottom; based on the determined water velocity and the bathymetric values, determining, by the hardware processor, a velocity model for the marine region; based on the determined velocity model and wavelet functions of the seismic source signals, calculating, by the hardware processor, the surface-scattered noise by solving a wave equation; and determining, by the hardware processor, the signals reflected from the earth subsurface layers by subtracting the surface-scattered noise from the received seismic data.

The foregoing and other described implementations can each, optionally, include one or more of the following features:

A first feature, combinable with any of the following features, wherein determining the water velocity for the first zone includes measuring the water velocity.

A second feature, combinable with any of the previous or following features, wherein determining bathymetric values of the ocean bottom includes measuring bathymetric values.

A third feature, combinable with any of the previous or following features, determining the velocity model for the marine region includes using the determined water velocity for the first zone and using a predetermined velocity for the second zone.

A fourth feature, combinable with any of the previous or following features, wherein the predetermined velocity for the second zone is a vertical velocity.

A fifth feature, combinable with any of the previous or following features, wherein the predetermined velocity for the second zone has a different velocity value than the determined water velocity for the first zone.

A sixth feature, combinable with any of the previous or following features, wherein the predetermined velocity for the second zone has a larger velocity value than the determined water velocity for the first zone.

A seventh feature, combinable with any of the previous or following features, wherein the wave equation is a three-dimensional acoustic wave equation.

An eighth feature, combinable with any of the previous or following features, wherein solving the wave equation includes using a numerical algorithm to solve the wave equation.

A ninth feature, combinable with any of the previous or following features, wherein subtracting the surface-scattered noise from the received seismic data includes using an adaptive filter to adaptively subtract the surface-scattered noise from the received seismic data.

A tenth feature, combinable with any of the previous or following features, wherein adaptively subtracting the surface-scattered noise from the received seismic data includes: filtering the surface-scattered noise using the adaptive filter; and subtracting the filtered surface-scattered noise from the received seismic data.

An eleventh feature, combinable with any of the previous or following features, wherein the adaptive filter uses an objective function that reduces a difference between the filtered surface-scattered noise and the received seismic data.

A twelfth feature, combinable with any of the previous or following features, wherein the adaptive filter is a Wiener filter.

A thirteenth feature, combinable with any of the previous or following features, wherein the ocean bottom has a bathymetry variation exceeding a predefined threshold.

In a second implementation, a system, comprising: a computer memory; and a hardware processor interoperably coupled with the computer memory and configured to perform operations comprising: receiving seismic data associated with a marine region, wherein the marine region includes an ocean bottom, a first zone including water above the ocean bottom, and a second zone including earth subsurface layers below the ocean bottom, wherein the seismic data is generated by using seismic source signals that propagate into the marine region, wherein the marine region reflects the seismic source signals, and wherein the received seismic data includes signals reflected from the earth subsurface layers and surface-scattered noise reflected from the ocean bottom and an ocean surface; determining a water velocity for the first zone; determining bathymetric values of the ocean bottom; based on the determined water velocity and the bathymetric values, determining a velocity model for the marine region; based on the determined velocity model and wavelet functions of the seismic source signals, calculating the surface-scattered noise by solving a wave equation; and determining the signals reflected from the earth subsurface layers by subtracting the surface-scattered noise from the received seismic data.

The foregoing and other described implementations can each, optionally, include one or more of the following features:

A first feature, combinable with any of the following features, wherein determining the velocity model for the marine region includes using the determined water velocity for the first zone and using a predetermined velocity for the second zone, and wherein the predetermined velocity for the second zone is a vertical velocity.

A second feature, combinable with any of the previous or following features, wherein subtracting the surface-scattered noise from the received seismic data includes using an adaptive filter to adaptively subtract the surface-scattered noise from the received seismic data, and wherein adaptively subtracting the surface-scattered noise from the received seismic data includes: filtering the surface-scattered noise using the adaptive filter; and subtracting the filtered surface-scattered noise from the received seismic data.

In a third implementation, a non-transitory, computer-readable medium storing one or more instructions executable by a computer system to perform operations comprising: receiving seismic data associated with a marine region, wherein the marine region includes an ocean bottom, a first zone including water above the ocean bottom, and a second zone including earth subsurface layers below the ocean bottom, wherein the seismic data is generated by using seismic source signals that propagate into the marine region, wherein the marine region reflects the seismic source signals, and wherein the received seismic data includes signals reflected from the earth subsurface layers and surface-scattered noise reflected from the ocean bottom and an ocean surface; determining a water velocity for the first zone; determining bathymetric values of the ocean bottom; based on the determined water velocity and the bathymetric values, determining a velocity model for the marine region; based on the determined velocity model and wavelet functions of the seismic source signals, calculating the surface-scattered noise by solving a wave equation; and determining the signals reflected from the earth subsurface layers by subtracting the surface-scattered noise from the received seismic data.

The foregoing and other described implementations can each, optionally, include one or more of the following features:

A first feature, combinable with any of the following features, wherein determining the velocity model for the marine region includes using the determined water velocity for the first zone and using a predetermined velocity for the second zone, and wherein the predetermined velocity for the second zone is a vertical velocity.

A second feature, combinable with any of the previous or following features, wherein subtracting the surface-scattered noise from the received seismic data includes using an adaptive filter to adaptively subtract the surface-scattered noise from the received seismic data, and wherein adaptively subtracting the surface-scattered noise from the received seismic data includes: filtering the surface-scattered noise using the adaptive filter; and subtracting the filtered surface-scattered noise from the received seismic data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising:
receiving, by a hardware processor, seismic data associated with a marine region, wherein the marine region includes an ocean bottom, a first zone including water above the ocean bottom, and a second zone including earth subsurface layers below the ocean bottom, wherein the seismic data is generated by using seismic source signals that propagate into the marine region, wherein the marine region reflects the seismic source signals, and wherein the received seismic data includes signals reflected from the earth subsurface layers and surface-scattered noise reflected from the ocean bottom and an ocean surface;
determining, by the hardware processor, a velocity of a seismic source signal in water for the first zone;
selecting, based on determining the velocity of the seismic source signal in the water, a vertically-constant subsurface velocity of the seismic source signal that is greater than the velocity of the seismic source signal in the water;
determining, by the hardware processor, bathymetric values of the ocean bottom for the marine region;

determining, based on the bathymetric values, that a variance of the bathymetric values of the ocean bottom for the marine region exceeds a threshold variance;

determining, by the hardware processor, a dual-layer velocity model for the marine region based on the determined velocity of the seismic source signal in the water and the selected vertically constant subsurface velocity of the seismic source signal based on the determined dual-layer velocity model and wavelet functions of the seismic source signals, calculating, by the hardware processor, the surface-scattered noise by solving a wave equation, wherein solving the wave equation using the dual-layer velocity model comprising the vertically-constant subsurface velocity of the seismic source signal and the determined velocity of the seismic source signal in the water results in a signal including a direct wave and the surface-scattered noise and does not include reflection signals from the subsurface;

and adaptively subtracting, by the hardware processor, the surface-scattered noise from the received seismic data using an adaptive filter, wherein the adaptive filter is applied for sampling time instants measured in the marine region.

2. The method of claim 1, wherein determining the velocity of a seismic source signal in the water for the first zone includes measuring the seismic signal in the water.

3. The method of claim 1, wherein determining bathymetric values of the ocean bottom includes measuring bathymetric values.

4. The method of claim 1, wherein determining the velocity model for the marine region includes using the determined velocity of the seismic source signal in the water for the first zone and using the selected vertically constant subsurface velocity for the second zone.

5. The method of claim 1, wherein the wave equation is a three-dimensional acoustic wave equation.

6. The method of claim 1, wherein solving the wave equation includes using a numerical algorithm to solve the wave equation.

7. The method of claim 1, wherein adaptively subtracting the surface-scattered noise from the received seismic data includes:
filtering the surface-scattered noise using the adaptive filter;
and subtracting the filtered surface-scattered noise from the received seismic data.

8. The method of claim 7, wherein the adaptive filter uses an objective function that reduces a difference between the filtered surface-scattered noise and the received seismic data.

9. The method of claim 7, wherein the adaptive filter is a Wiener filter.

10. The method of claim 1, wherein the ocean bottom has a bathymetry variation exceeding a predefined threshold.

11. A system, comprising:
a computer memory;
and a hardware processor interoperably coupled with the computer memory and configured to perform operations comprising:
receiving seismic data associated with a marine region, wherein the marine region includes an ocean bottom, a first zone including water above the ocean bottom, and a second zone including earth subsurface layers below the ocean bottom, wherein the seismic data is generated by using seismic source signals that propagate into the marine region, wherein the marine region reflects the seismic source signals, and wherein the received seismic data includes signals reflected from the earth subsurface layers and surface-scattered noise reflected from the ocean bottom and an ocean surface;
determining a velocity of a seismic source signal in water for the first zone;
selecting, based on determining the velocity of the seismic source signal in the water, a vertically-constant subsurface velocity of the seismic source signal that is greater than the velocity of the seismic source signal in the water;
determining bathymetric values of the ocean bottom for the marine region;
determining, based on the bathymetric values, that a variance of the bathymetric values of the ocean bottom for the marine region exceeds a threshold variance;
determining a dual-layer velocity model for the marine region based on the determined velocity of the seismic source signal in the water and the selected vertically constant subsurface velocity of the seismic source signal
based on the determined dual-layer velocity model and wavelet functions of the seismic source signals, calculating the surface-scattered noise by solving a wave equation, wherein solving the wave equation using the dual-layer velocity model comprising the vertically-constant subsurface velocity of the seismic source signal and the determined velocity of the seismic source signal in the water results in a signal including a direct wave and the surface-scattered noise and does not include reflection signals from the subsurface;
and adaptively subtracting the surface-scattered noise from the received seismic data using an adaptive filter, wherein the adaptive filter is applied for sampling time instants measured in the marine region.

12. The system of claim 11, wherein determining the velocity model for the marine region includes using the determined velocity of the seismic source signal in the water for the first zone and using the selected vertically constant subsurface velocity for the second zone.

13. The system of claim 11, wherein adaptively subtracting the surface-scattered noise from the received seismic data using the adaptive filter includes:
filtering the surface-scattered noise using the adaptive filter;
and subtracting the filtered surface-scattered noise from the received seismic data.

14. A non-transitory, computer-readable medium storing one or more instructions executable by a computer system to perform operations comprising:
receiving seismic data associated with a marine region, wherein the marine region includes an ocean bottom, a first zone including water above the ocean bottom, and a second zone including earth subsurface layers below the ocean bottom, wherein the seismic data is generated by using seismic source signals that propagate into the marine region, wherein the marine region reflects the seismic source signals, and wherein the received seismic data includes signals reflected from the earth subsurface layers and surface-scattered noise reflected from the ocean bottom and an ocean surface;
determining a velocity of a seismic source signal in water for the first zone;
selecting, based on determining the velocity of the seismic source signal in the water, a vertically-constant subsurface velocity of the seismic source signal that is greater than the velocity of the seismic source signal in the water;

determining bathymetric values of the ocean bottom for the marine region;

determining, based on the bathymetric values, that a variance of the bathymetric values of the ocean bottom for the marine region exceeds a threshold variance;

determining a dual-layer velocity model for the marine region based on the determined velocity of the seismic source signal in the water and the selected vertically constant subsurface velocity of the seismic source signal;

based on the determined dual-layer velocity model and wavelet functions of the seismic source signals, calculating the surface-scattered noise by solving a wave equation, wherein solving the wave equation using the dual-layer velocity model comprising the vertically-constant subsurface velocity of the seismic source signal and the determined velocity of the seismic source signal in the water results in a signal including a direct wave and the surface-scattered noise and does not include reflection signals from the subsurface;

and adaptively subtracting the surface-scattered noise from the received seismic data using an adaptive filter, wherein the adaptive filter is applied for sampling time instants measured in the marine region.

15. The non-transitory, computer-readable medium of claim 14, wherein determining the velocity model for the marine region includes using the determined velocity of the seismic source signal in the water for the first zone and using the selected vertically constant subsurface velocity for the second zone.

16. The non-transitory, computer-readable medium of claim 14, wherein adaptively subtracting the surface-scattered noise from the received seismic data using the adaptive filter includes:

filtering the surface-scattered noise using the adaptive filter;

and subtracting the filtered surface-scattered noise from the received seismic data.

* * * * *